C. E. Haynes,
Preserving Beer.
No. 109,126.     Patented Nov. 8, 1870.

Witnesses
Edw. L. Griffith
Geo. A. Loring

Cornelius E. Haynes
by his Attorney
Frederick Curtis

United States Patent Office.

CORNELIUS E. HAYNES, OF BOSTON, MASSACHUSETTS.

Letters Patent No. 109,126, dated November 8, 1870.

IMPROVEMENT IN PRESERVING BEER AND ALE ON DRAUGHT.

The Schedule referred to in these Letters Patent and making part of the same.

*To all to whom these presents shall come:*

Be it known that I, CORNELIUS E. HAYNES, of Boston, in the county of Suffolk and Commonwealth of Massachusetts, have made an invention of a certain new and useful Mode of Forcing Beer from Barrels; and do hereby declare the following to be a full, clear, and exact description thereof, due reference being had to the accompanying drawing making part of this specification, and in which—

Figure 1:
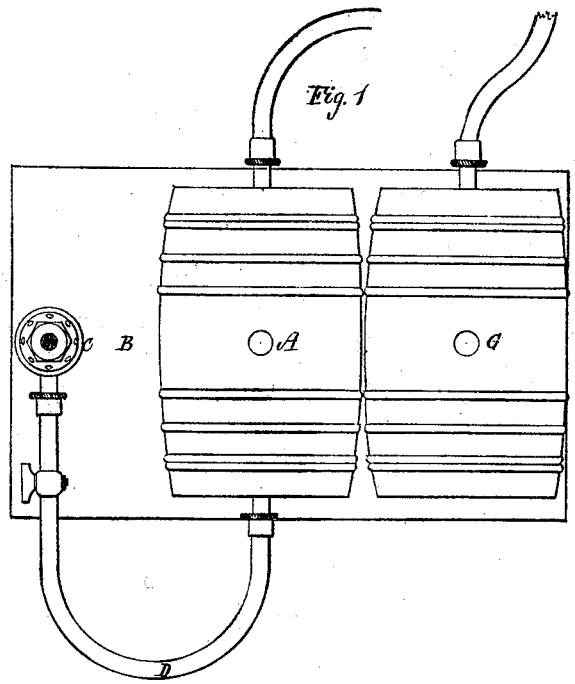

Figure 1 is a plan, and

Figure 2:
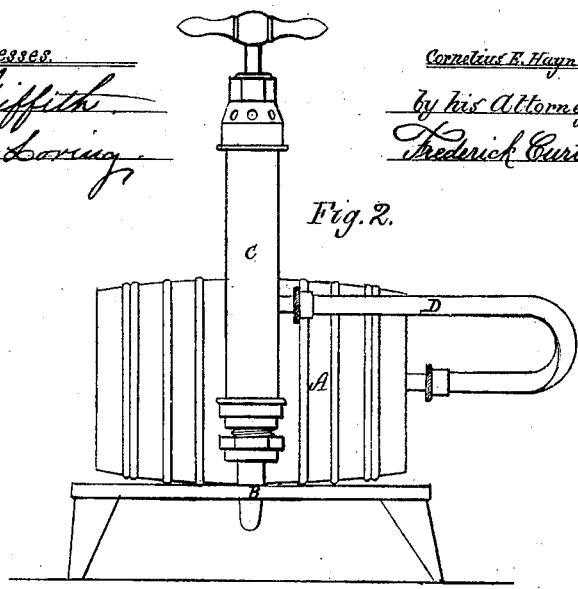

Figure 2, an elevation of an apparatus embodying my invention.

The principal object upon which these improvements are based is the mode of supplying to beer-barrels the loss of internal pressure, due to the gradual diminution of their contents, the purpose of the invention being to produce a means of maintaining a pressure upon the beer within a barrel without imparting to it a foreign, disagreeable, or injurious flavor and odor.

The means which I have adopted consist, in common with others, in introducing into the interior of a beer-barrel a current or blast of air, for the purpose of expelling its contents without the aid of a pump; but the novel feature of my invention will be found to consist in impregnating the air, thus introduced, with the vapors of alcohol or alcoholic spirits in some form, the employment of alcohol in this manner having the effect not only of maintaining the air-supply reservoir of the apparatus in a pure and wholesome condition, but of insuring the life and original condition of the beer as long as it lasts, without injuriously impregnating it with a disagreeable flavor.

In carrying out my present invention in a practical form, I provide a suitable reservoir or tank, A, mounted in a proper manner upon a bench or platform, B, this bench being of sufficient size to contain, in addition to the one or more tanks which may be required, the desired number of beer-barrels.

In close proximity to the tank A, I erect, upon the platform B, an air force-pump, C, and I connect this pump with the tank by means of a pipe, D, which enters the latter at about its center or above the center.

This force-pump is for the purpose of creating a blast of air within the tank A, and this blast of air is conducted to the interior of the barrel, which may be placed alongside of it, and which is represented at G in the drawing, and allowed to act upon the top of the beer contained therein, by this means imparting to it a pressure sufficient to force it, when drawn from the barrel, to any desired and reasonable height.

The tank A is to contain a small quantity of alcohol or other spirits, with which the air, in its passage from the tank, becomes charged to some extent, the spirit being renewed within the tank as it may become exhausted.

The tank A and also the beer-barrel are to be provided with a suitable coupling or means of attaching a pipe, at pleasure, to permit of passage of gas from the tank to the barrel, and one or both of these, or the pipe between their coupling is to be provided with a faucet, in order to shut off this passage of gas when desirable.

The exodus of gas from the tank A should be at its upper part, in order to prevent ebullition and escape of the spirits contained therein, which would result, did not the inrushing air make its entrance above such spirits, while the inlet port of the beer-barrel, by which the impregnated air or gas enters such barrel, should be at the extreme upper part of the same, for the reason that it must act upon the top of the beer in order to expel it.

The beer-barrel should be provided, as a matter of course, with an exit-pipe or connection, at its extreme lower part, to permit of escape of its contents.

The introduction of atmospheric air into the interior of a beer-barrel renders its contents stale and lifeless.

By my mode of procedure the air becomes impregnated with alcoholic vapors, which prevents this evil effect upon the beer, and, having an affinity for it, will not injuriously or disagreeably change its flavor or odor.

*Claims.*

What I claim is—

1. The process herein-described for preserving beer, which consists in introducing into a beer-barrel a blast of gas or air impregnated with alcoholic vapors, for purposes specified.

2. In combination with a beer-barrel, one or more tanks for containing the charged air or gas, and a force-pump for driving the said gas into the beer-barrel, the tank and barrel being connected, and the whole operating as herein explained.

CORNELIUS E. HAYNES.

Witnesses:
EDWARD GRIFFITH,
JAMES D. TURNER,
FRED. CURTIS.